US012740639B2

(12) United States Patent
Villar Duran et al.

(10) Patent No.: US 12,740,639 B2
(45) Date of Patent: Sep. 22, 2026

(54) METHODS AND SYSTEMS FOR CONTROLLING AN ELECTRICAL TOOTHBRUSH

(71) Applicant: KONINKLIJKE PHILIPS N.V., Eindhoven (NL)

(72) Inventors: Jose Martin Villar Duran, Lake Forest Park, WA (US); Chelsea Pereira, Bothell, WA (US); Peter Choi, Bothell, WA (US); Gul Dikmen, Bothell, WA (US); Fereshteh Khodabakhshi, Seattle, WA (US); Prithy Sukumaran, Redmond, WA (US); Nathan Farrell, Kirkland, WA (US); Ishita Chaudhuri, Sterling, VA (US); Brian Esley Tidball, Bothell, WA (US); Ivonne Labadie Lezama, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 457 days.

(21) Appl. No.: 18/032,861

(22) PCT Filed: Oct. 15, 2021

(86) PCT No.: PCT/EP2021/078552

§ 371 (c)(1),
(2) Date: Apr. 20, 2023

(87) PCT Pub. No.: WO2022/084163

PCT Pub. Date: Apr. 28, 2022

(65) Prior Publication Data

US 2023/0389689 A1 Dec. 7, 2023

Related U.S. Application Data

(60) Provisional application No. 63/094,191, filed on Oct. 20, 2020.

(30) Foreign Application Priority Data

Nov. 16, 2020 (EP) .................................... 20207802

(51) Int. Cl.
*A46B 15/00* (2006.01)
*A46B 5/00* (2006.01)
(Continued)

(52) U.S. Cl.
CPC ........ *A46B 15/0006* (2013.01); *A46B 5/0095* (2013.01); *A46B 15/0008* (2013.01);
(Continued)

(58) Field of Classification Search
CPC .............. A46B 15/0006; A46B 5/0095; A46B 15/0008; A46B 2200/1066; A61C 17/221;
(Continued)

(56) References Cited

U.S. PATENT DOCUMENTS

2007/0079455 A1* 4/2007 Brewer ............. A61C 17/3481 15/22.2
2008/0313829 A1* 12/2008 Dabrowski ........ A46B 15/0004 15/22.1
(Continued)

FOREIGN PATENT DOCUMENTS

CN 106618775 A 5/2017
CN 110597447 A 12/2019
(Continued)

OTHER PUBLICATIONS

International Search Report and Written Opinion Dated Nov. 19, 2021 For International Application No. PCT/EP2021/078552 Filed Oct. 15, 2021.

*Primary Examiner* — Kenneth M Lo
*Assistant Examiner* — Zachary Andrew Cain

(57) ABSTRACT

The invention provides a method for controlling an operation of an electrical toothbrush with an interchangeable
(Continued)

brush head. The method includes obtaining an existing operation mode of the electrical toothbrush and identifying a new interchangeable brush head when the new interchangeable brush head is provided to the electrical toothbrush. A new operation mode associated with the new interchangeable brush head is identified, the new operation mode being different from the existing operation mode. An input is requested from a user to confirm that the operation of the electrical toothbrush should change to the new operation mode. The operation mode of the electrical toothbrush is then changed to the new operation mode or maintained in the existing operation mode based on the user input.

15 Claims, 4 Drawing Sheets

(51) Int. Cl.
*A61C 17/22* (2006.01)
*G08B 7/06* (2006.01)

(52) U.S. Cl.
CPC .... *A61C 17/221* (2013.01); *A46B 2200/1066* (2013.01); *A61C 2204/005* (2013.01); *G08B 7/06* (2013.01)

(58) Field of Classification Search
CPC ........ A61C 2204/005; A61C 2204/002; A61C 17/225; G08B 7/06
See application file for complete search history.

(56) References Cited

U.S. PATENT DOCUMENTS

2018/0064238 A1* 3/2018 Cook ................. A46B 15/0002
2018/0132602 A1 5/2018 Gatzemeyer
2020/0029680 A1* 1/2020 Farrell ............... A46B 15/0044
2021/0093428 A1 4/2021 Liu

FOREIGN PATENT DOCUMENTS

WO 2014016718 A1 1/2014
WO 2018005484 A1 1/2018

* cited by examiner

METHODS AND SYSTEMS FOR CONTROLLING AN ELECTRICAL TOOTHBRUSH

This application is the U.S. National Phase application under 35 U.S.C. § 371 of International Application No. PCT/EP2021/078552, filed on Oct. 15, 2021, which claims the benefit of U.S. application No. 63/094,191, filed Oct. 20, 2020 and EP Application Serial No. 20207802.8, filed Nov. 16, 2020. These applications are hereby incorporated by reference herein.

FIELD OF THE INVENTION

The invention relates to the field of electrical tooth brushing devices, and more specifically to the field of controlling an electrical toothbrush.

BACKGROUND OF THE INVENTION

Many electrical toothbrushes can be operated according to several different operation modes. The different operation modes of the electrical toothbrush may be automatically altered based on the interchangeable brush head attached to the electrical toothbrush.

When a user first starts using an electrical toothbrush, an operation mode is typically applied to the electrical toothbrush based on the factory settings of the toothbrush and the currently attached interchangeable brush head. If the user changes the current brush head for a different brush head having a different recommended operation mode associated with it, the electrical toothbrush may automatically change the current operation mode to the different recommended operation mode.

However, the user may not be aware that the new interchangeable brush head has a different recommended operation mode to the current operation mode of the electrical toothbrush. Accordingly, automatically changing the operation mode of the electrical toothbrush may be an unexpected change, which may lead to user confusion and less effective brushing using the electrical toothbrush.

There is therefore a need for a manner of controlling the operation of the electrical toothbrush without causing confusion to the user.

US 2007/079455 discloses a toothbrush having an ultrasound transducer for generating oscillations at sonic frequencies. A device head for example has an identifier which may be associated with operating protocols so that on initiation of an operating cycle, the associated operating protocol is run.

US 2020/029680 discloses an electric toothbrush which identifies attachment of a toothbrush head. A user may define desired output characteristics for the toothbrush head.

SUMMARY OF THE INVENTION

The invention is defined by the claims.

According to examples in accordance with an aspect of the invention, there is provided a computer-implemented method for controlling an operation of an electrical toothbrush with an interchangeable brush head, the method comprising:

- obtaining an existing operation mode of the electrical toothbrush;
- receiving an indication from a brush head identification unit that a new interchangeable brush head has been identified as being provided to the electrical toothbrush;
- identifying a new operation mode associated with the new interchangeable brush head, the new operation mode being different from the existing operation mode;
- controlling a user interface to request an input from a user to confirm that the operation of the electrical toothbrush should change to the new operation mode; and
  - if the user provides an input confirming that the operation of the electrical toothbrush should change to the new operation mode, changing the operation of the electrical toothbrush to the new operation mode; and
  - if the user provides an input indicating that the operation of the electrical toothbrush should not change to the new operation mode, or if the user does not provide a user input, maintaining the existing operation mode of the electrical toothbrush.

The method provides a means for the user to always be in control of the operation of the electrical toothbrush, even when a new interchangeable brush head having different associated operational mode is installed. Thus, the method ensures that the user will always be aware of any change in operation of the electrical toothbrush before the change occurs.

Put another way, the operation of the toothbrush is prevented from automatically changing without the user's consent.

In this way, confusion of the user resulting from unexpected changes in the operation of the electrical toothbrush may be avoided and more effective and consistent brushing may be achieved.

In an embodiment, the new operation mode comprises one or more of:

- a new brushing routine;
- a new brushing intensity;
- a new brushing time;
- a new brushing amplitude; and
- a new brushing frequency.

In an embodiment, the method further comprises:

- receiving an additional user input to adjust the new operation mode;
- updating the new operation mode based on the additional user input, thereby generating an updated operation mode; and
- changing the operation of the electrical toothbrush to the updated operation mode.

In this way, the user can adjust the operation mode of the toothbrush to suit their needs and the updated operation mode may be maintained for subsequent brushing sessions.

In an embodiment, identifying the new interchangeable brush head comprises:

- obtaining a brush head identification code from the new interchangeable brush head; and
- identifying the new interchangeable brush head based on the brush head identification code.

According to examples in accordance with an aspect of the invention, there is provided a computer program product comprising computer program code means which, when executed on a computing device having a processing system, cause the processing system to perform all of the steps of the methods described above.

According to examples in accordance with an aspect of the invention, there is provided a processing unit for controlling an operation of an electrical toothbrush with an interchangeable brush head, wherein the processing unit is adapted to:

- obtain an existing operation mode of the electrical toothbrush;

receive an indication from a brush head identification unit that a new interchangeable brush head has been identified as being provided to the electrical toothbrush;

identify a new operation mode associated with the new interchangeable brush head, the new operation mode being different to the existing operation mode;

control a user interface to request an input from a user to confirm that the operation of the electrical toothbrush should change to the new operation mode; and if the user provides an input confirming that the operation of the electrical toothbrush should change to the new operation mode, change the operation of the electrical toothbrush to the new operation mode;

if the user provides an input indicating that the operation of the electrical toothbrush should not change to the new operation mode, or the user does not provide a user input, maintain the existing operation mode of the electrical toothbrush.

According to examples in accordance with an aspect of the invention, there is provided a system for controlling an operation of an electrical toothbrush with an interchangeable brush head, the system comprising:

an electrical toothbrush, the electrical toothbrush having a brush head identification unit adapted to obtain an identifier of a new interchangeable brush head;

the processing unit as described above, wherein the processing unit is in communication with the brush head identification unit, and wherein identifying the new interchangeable brush head is based on the identifier of the new interchangeable brush head; and a user interface in communication with the processing unit, wherein the user interface is adapted to:

provide a request to the user to confirm that the operation of the electrical toothbrush should change; and receive a user input in response to the request.

In an embodiment, the new operation mode comprises one or more of:

a new brushing routine;

a new brushing intensity; and a new brushing time.

In an embodiment, the processing unit is further adapted to:

receive an additional user input to adjust the new operation mode;

update the new operation mode based on the additional user input, thereby generating an updated operation mode; and change the operation of the electrical toothbrush to the updated operation mode.

In an embodiment, the processing unit is integrated into the electrical toothbrush.

In an embodiment, the system further comprises a charging unit adapted to receive the electrical toothbrush, and wherein the processing system is integrated into the charging unit.

In an embodiment, the processing unit is integrated into a remote processing system, and wherein the electrical toothbrush further comprises a communication unit in communication with the remote processing system.

In a further embodiment, the user interface is integrated into the remote processing system.

In an embodiment, the remote processing system is incorporated into a smart device, such as:

a smartphone;

a smartwatch; and a smart home device.

In an embodiment, the brush head identification unit comprises one or more of:

a radio frequency identification tag reader, for reading a radio frequency identification tag on the new interchangeable brush head; and a visual code reader, for reading a visual code corresponding to the new interchangeable brush head.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
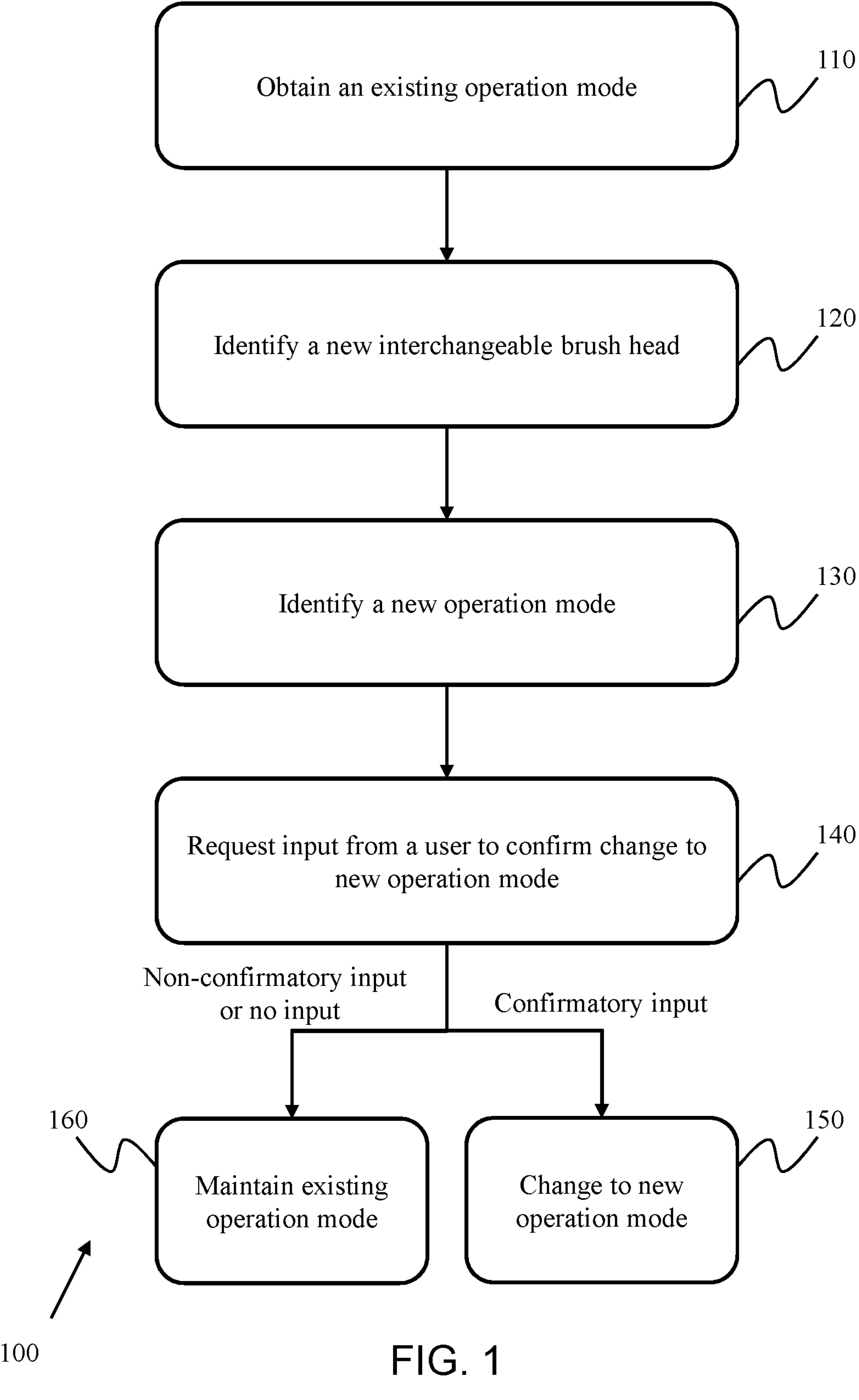
FIG. 1 shows a method for controlling an operation of an electrical toothbrush with an interchangeable brush head.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for controlling an operation of an electrical toothbrush with an interchangeable brush head. The method includes obtaining an existing operation mode of the electrical toothbrush and identifying a new interchangeable brush head when the new interchangeable brush head is provided to the electrical toothbrush. A new operation mode associated with the new interchangeable brush head is identified, the new operation mode being different from the existing operation mode.

An input is requested from a user to confirm that the operation of the electrical toothbrush should change to the new operation mode. If the user provides an input confirming that the operation of the electrical toothbrush should change to the new operation mode, the operation of the electrical toothbrush is changed to the new operation mode. If the user provides an input indicating that the operation of the electrical toothbrush should not change to the new operation mode, or if the user does not provide a user input, the existing operation mode of the electrical toothbrush is maintained.

FIG. 1 shows a method 100 for controlling an operation of an electrical toothbrush with an interchangeable brush head.

The method begins in step 110 by obtaining an existing operation mode of the electrical toothbrush. The existing operation may be any current operation mode of an electrical toothbrush. For example, the existing operation mode may be associated with an existing interchangeable brush head attached to the electrical toothbrush. Alternatively, the existing operation mode may be a standard recommended two minute brushing routine.

In step 120, a new interchangeable brush head is identified when the new interchangeable brush head is provided to the electrical toothbrush. Identifying the new interchangeable brush head may include obtaining a brush head identification code from the new interchangeable brush head and identifying the new interchangeable brush head based on the brush head identification code. Examples of brush head identification codes are discussed below with reference to FIGS. 2 and 4.

In step 130, a new operation mode associated with the new interchangeable brush head is identified. The new operation mode may include one or more of: a new brushing routine; a new brushing intensity; a new brushing time; a new brushing amplitude; and a new brushing frequency. The new operation mode may include any combination of alterations to the operation mode of the electrical toothbrush. For example, the new operation mode may include a new brushing frequency and a new brushing amplitude, or pressure. Alternatively, the new operation mode may include a new brushing time and a new brushing frequency, such as more frequent but shorter brushing sessions. The method continues if the new operation mode is different from the existing operation mode. If the new operation mode is the same as the existing operation mode, no change in operation mode would occur and the user input does not need to be sought.

In step 140, an input is requested from a user to confirm that the operation of the electrical toothbrush should change to the new operation mode. The input may be requested from the user in a number of ways, examples of which are discussed below with reference to FIGS. 2 to 4.

If the user provides an input confirming that the operation of the electrical toothbrush should change to the new operation mode, the method progresses to step 150 and the operation of the electrical toothbrush is changed to the new operation mode.

If the user provides an input indicating that the operation of the electrical toothbrush should not change to the new operation mode, or if the user does not provide an input, the method progresses to step 160 and the existing operation mode of the electrical toothbrush is maintained.

By way of example, when the user first starts using an electrical toothbrush, an operation mode may be selected based on the factory settings of the electrical toothbrush and the attached interchangeable brush head. If the user then changes the existing interchangeable brush head for a new interchangeable brush head with a different recommended brushing routine, or new operation mode, the existing operation mode of the electrical toothbrush does not automatically change to avoid confusing the user.

Rather, the user is provided with a request to provide an input confirming that they wish for the operation of the electrical toothbrush to change. For example, if the electrical toothbrush is connected to a smart device belonging to the user, the user may be provided with the request, for example, by way of an application, or other software, on the smart device. The request may include a recommendation to change the operation mode based on the new interchangeable brush head. If the user does not choose to change from the existing operation mode to the new operation mode, the electrical toothbrush remains in existing operation mode with the new interchangeable brush head. If the user does choose to change from the existing operation mode to the new operation mode, the operation mode of the electrical toothbrush will change accordingly.

If the user provides a new interchangeable brush head that can only be used for one specific function, for example a tongue care brush head for performing a tongue care routine, the provision of said new interchangeable brush head may be interpreted as a confirmatory user input indicating a desire to change the operation mode of the electrical toothbrush to the new operation mode. In other words, if the new interchangeable brush head can only be used for one specific function, the user may not be provided with a separate request for confirming the change in operation mode.

After the user has confirmed that the operation mode of the electrical toothbrush should change to the new operation mode, the user may wish to further adjust the new operation mode to better suit their individual needs. In this case, the method may further comprise receiving an additional user input to adjust the new operation mode and updating the new operation mode based on the additional user input, thereby generating an updated operation mode. The operation of the electrical toothbrush may then be changed to the updated operation mode.

The additional user input may be provided in a similar manner to the user input confirming that the operation mode of the electrical toothbrush should change or using any other suitable user input. For example, the user my provide a user input by way of a user interface provided on the electrical toothbrush itself, on an accessory of the electrical toothbrush, such as a charging unit, or a smart device connected to the electrical toothbrush.

Figure 2:
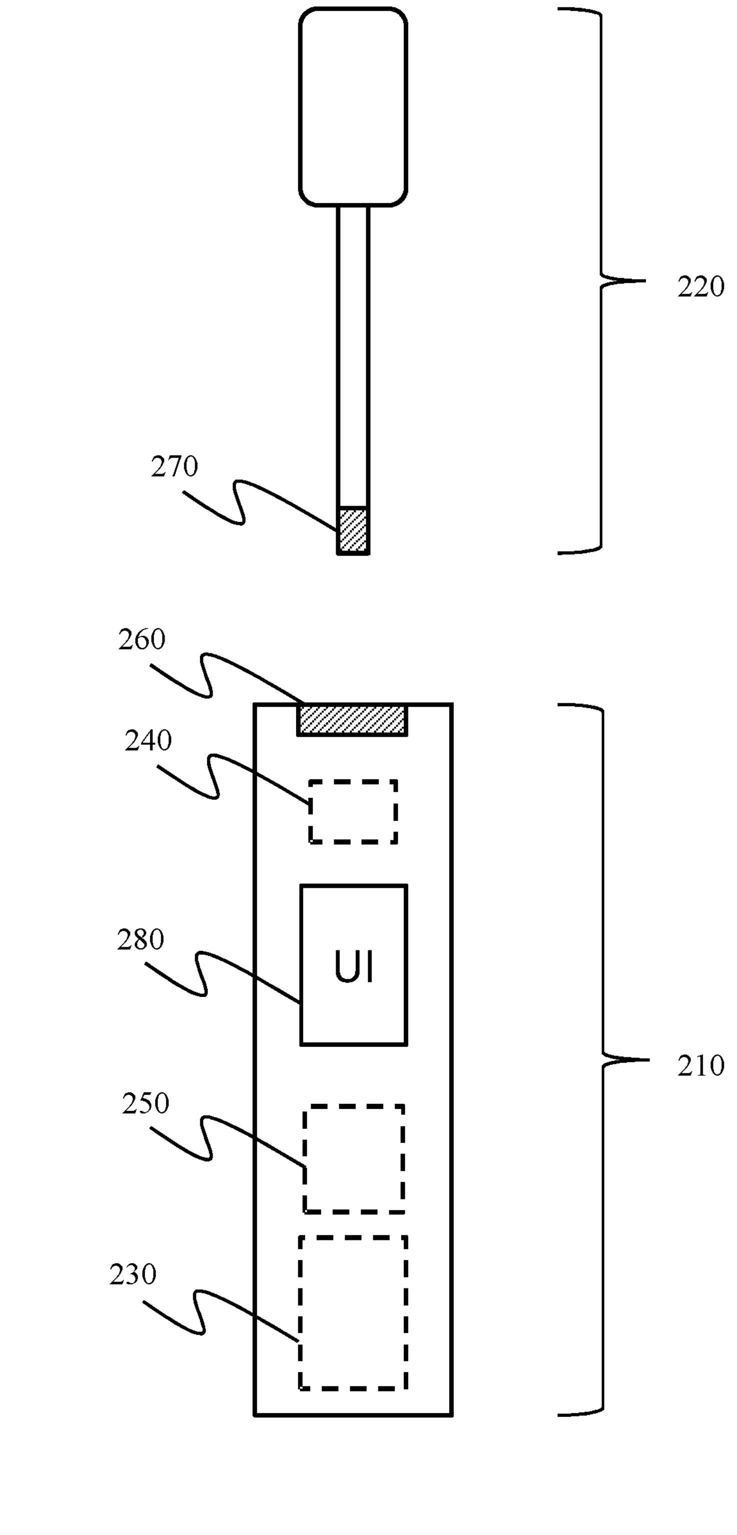
FIG. 2 shows a schematic representation of an electrical toothbrush according to an aspect of the invention.

FIG. 2 shows a schematic representation of an electrical toothbrush 200, which may form at least part of a system for controlling an operation of an electrical toothbrush with an interchangeable brush head. The electrical toothbrush may comprise a body portion 210 and an interchangeable brush head 220, wherein the interchangeable brush head is adapted to be provided to a user's mouth for performing an oral care routine. The body portion 210 of the electrical toothbrush 200 may include a battery 230 and a drive unit 240 for operating the interchangeable brush head 220.

In the example shown in FIG. 2, the electrical toothbrush 200 includes a processing unit 250 for controlling an operation of the electrical toothbrush. The processing unit may be adapted to implement any of the methods described above with reference to FIG. 1.

More specifically, the processing unit 250 may be adapted to: obtain an existing operation mode of the electrical toothbrush; identify a new interchangeable brush head when the new interchangeable brush head is provided to the electrical toothbrush; identify a new operation mode associated with the new interchangeable brush head, the new operation mode being different to the existing operation mode; request an input from a user to confirm that the operation of the electrical toothbrush should change to the new operation mode; and if the user provides an input confirming that the operation of the electrical toothbrush should change to the new operation mode, change the operation of the electrical toothbrush to the new operation mode; if the user provides an input indicating that the operation of the electrical toothbrush should not change to the new operation mode, or the user does not provide a user input, maintain the existing operation mode of the electrical toothbrush.

The electrical toothbrush 200 further comprises a brush head identification unit 260 adapted to obtain an identifier of the interchangeable brush head 220, wherein the identification of the new interchangeable brush head, and the new operation mode, is based on the obtained identifier.

For example, the interchangeable brush head 220 may comprise a radio frequency identification (RFID) tag 270, in which case the identification unit 260 may comprise an RFID reader. When the new interchangeable brush head is provided to the body portion 210 of the electrical toothbrush, the RFID tag may be bought within range of the RFID tag reader of the identification unit. The identifier of the interchangeable brush head may then be read from the RFID tag by the identification unit and provided to the processing unit 250 for identifying the new interchangeable brush head and the corresponding new operation mode. For example, the electrical toothbrush may comprise a memory unit containing a look-up table of identifiers, interchangeable brush heads corresponding to said identifiers and operation modes corresponding to said interchangeable brush heads.

Alternatively, the electrical toothbrush may comprise a communications unit in communication with a remote processing unit, the remote processing unit being adapted to perform the same operations as the processing unit 250 described above. The identifier of the interchangeable brush head obtained by the identification unit may be communicated to the remote processing unit for identifying the new interchangeable brush head and the corresponding new operation mode.

In the example shown in FIG. 2, the electrical toothbrush 200 further comprises a user interface 280 adapted to provide a request to the user to confirm that the operation of the electrical toothbrush should change and receive a user input in response to the request.

For example, the user interface may include one or more of: a light source, to communicate the request by way of a light signal; a display, to provide a visual request; a speaker, to provide an audible request; and the like. Further, the user interface may include one or more of: a button, wherein the user input may include a button press, an extended button press, a series of button presses and the like; a microphone, wherein the user input may include an audible user input; a touch screen, wherein the user input may include a tactile user input; and the like.

Figure 3:
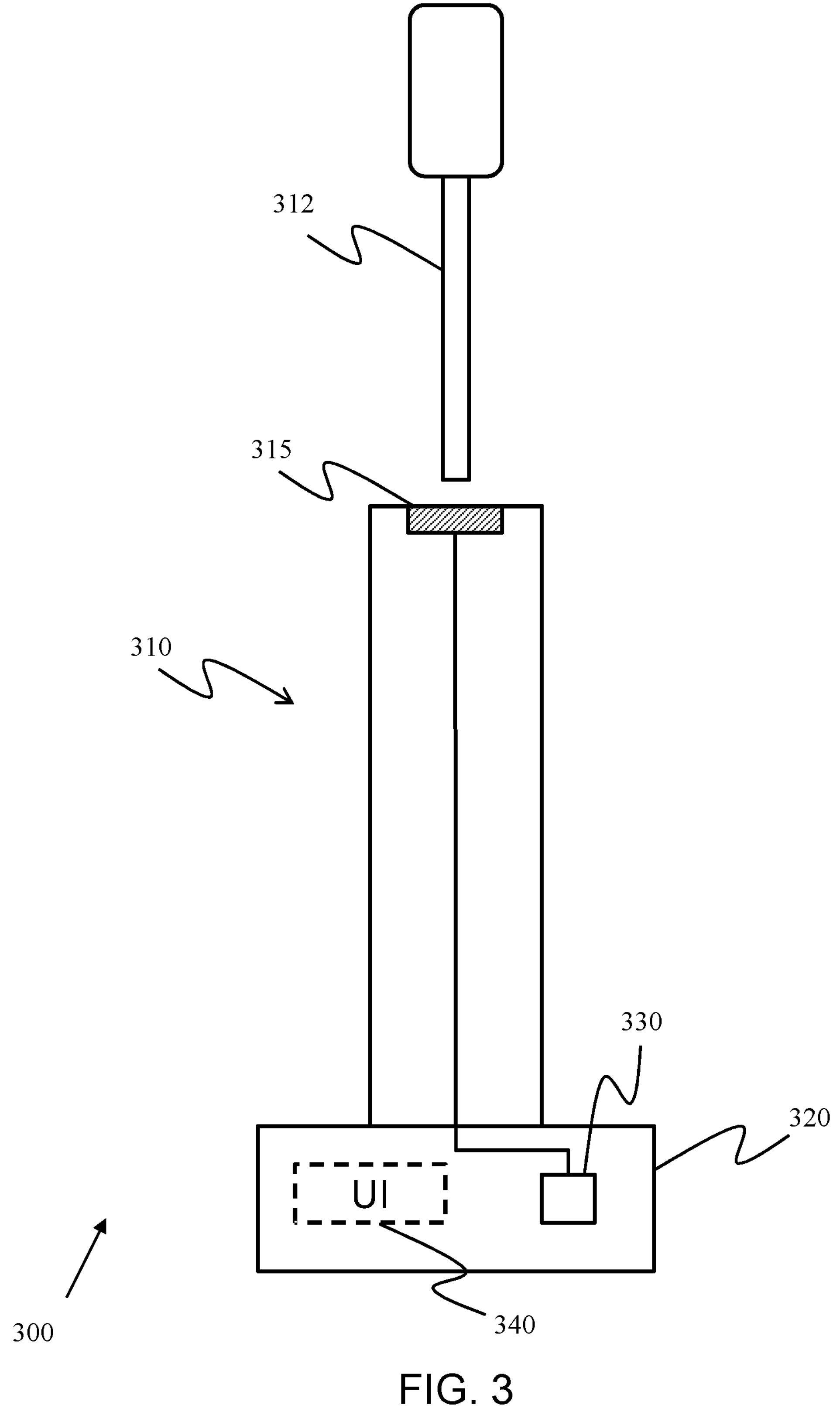
FIG. 3 shows a schematic representation of an electrical toothbrush system according to an aspect of the invention.

FIG. 3 shows a schematic representation of a system 300 for controlling an operation of an electrical toothbrush 310 with an interchangeable brush head 312. The electrical toothbrush 310 may comprise one or more of the components described above with reference to FIG. 2. As described above, the electrical toothbrush may comprise an identification unit 315 for obtaining an identifier from the interchangeable brush head.

In the example shown in FIG. 3, the system 300 comprises a charging unit 320 adapted to receive, and charge, the electrical toothbrush 310. Further, the charging unit 320 comprises a processing unit 330, which may be implemented as described above with reference to FIG. 2. In other words, the processing unit may be provided in the charging unit of the system rather than the electrical toothbrush itself. The identification unit of the electrical toothbrush may be brought into communication with the processing unit when the electrical toothbrush is brought into contact with the charging unit.

The electrical toothbrush 310 and the charging unit 320 may further comprise communication units to establish wireless communication between the electrical toothbrush and the charging unit when they are not physically connected.

Further, the charging unit may comprise a user interface 340, which may be implemented as described above with reference to FIG. 2.

Figure 4:
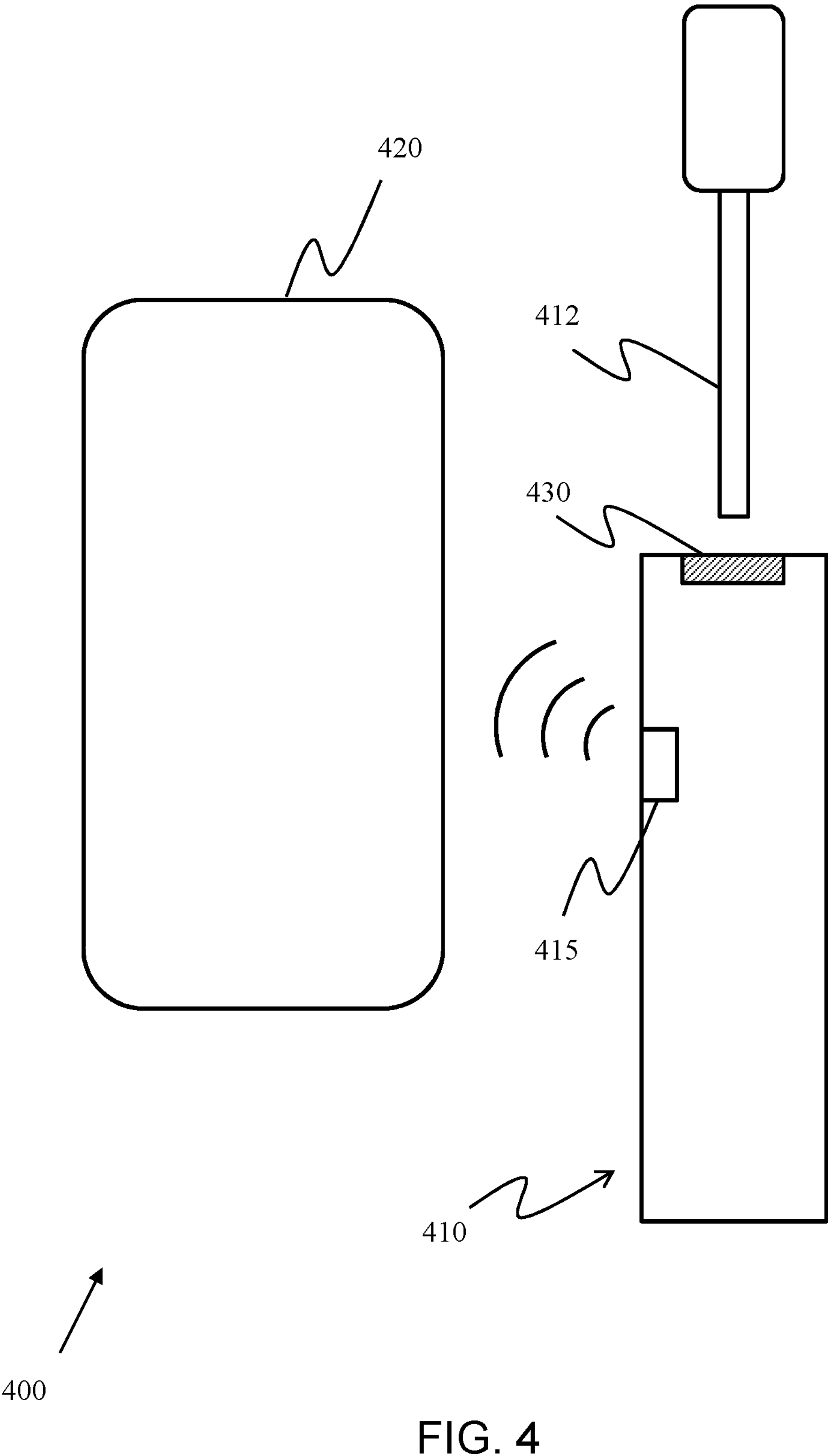
FIG. 4 shows a schematic representation of an electrical toothbrush system according to a further aspect of the invention.

FIG. 4 shows a schematic representation of a system 400 for controlling an operation of an electrical toothbrush 410 with an interchangeable brush head 412, the electrical toothbrush comprising a communication unit 415 in wireless communication with a remote processing unit in the form of a smart device 420. It should be noted that any remote processing unit capable of communication with the communication unit may be used to perform the methods herein. For example, at least part of the remote processing unit may be incorporated into a computer, a laptop, a tablet, a server, a distributed processing network and the like.

In the example shown in FIG. 4, the smart device 420 is a smartphone; however, the smart device may comprise one or more of: a smartphone; a smartwatch; and a smart home device.

One or more of the processing unit, the user interface and the identification unit may be incorporated into the smart device.

In the example shown in FIG. 4, the electrical toothbrush comprises an identification unit 430 for obtaining an identifier from the interchangeable brush head as described above with reference to FIG. 2. However, the identification unit may be incorporated into the smart device, for example by using a camera of the smart device to scan a visual code of the interchangeable brush head, such as a QR code or a bar code. The visual code may be provided on the brush head itself or on a packaging element of the interchangeable brush head. Further, in the example shown in FIG. 4, the processing unit and the user interface are incorporated into the smart device 420.

By way of example, when the user provides a new interchangeable brush head 412 to the electrical toothbrush 410, the identification unit 430 obtains an identifier of the interchangeable brush head, for example by reading an RFID tag on the interchangeable brush head. The identifier may then be provided to the communication unit 415 to be communicated to the connected smart device 420, such as a user's smartphone.

Upon receiving the identifier of the interchangeable brush head, the smart device is adapted to, by way of a processing unit of the smart device, identify the new interchangeable brush head based on the received identifier and identify a new operation mode corresponding to the identified interchangeable brush head. For example, the smart device may utilize a look-up table, stored in a local memory of the smart device or a remotely accessible memory such as a remote server accessed over the internet, in order to identify the new interchangeable brush head and the new operation mode based on the obtained identifier.

Upon identifying the new operation mode, the smart device may provide a request to the user to confirm that the operation mode of the electrical toothbrush 410 should change from the existing operation mode to the new operation mode. The request may be provided, for example, by way of an application, or other software, provided on the smart device. The user input may include any suitable input from the user, such as: providing a touch input on a touch enabled surface of the smart device; pressing a button of the smart device; providing an audible input to be received by a microphone of the smart device; and the like.

If the user provides an input confirming that the operation of the electrical toothbrush should change to the new operation mode, the smart device may communicate to the electrical toothbrush, by way of the communication unit 415, that the operation of the electrical toothbrush should change to the new operation mode.

If the user provides an input indicating that the operation of the electrical toothbrush should not change to the new operation mode, the smart device may communicate to the electrical toothbrush, by way of the communication unit 415, that the existing operation mode of the electrical toothbrush should be maintained.

If the user does not provide any input, for example because they did not see the request, the existing operation mode of the electrical toothbrush may be maintained until the user does provide an input.

It should be noted that any combination of the embodiments described in FIGS. 2 to 4 may also be achieved. For example, the identification unit may be incorporated into the electrical toothbrush, the processing unit may be incorporated into the charging unit and the user interface may be incorporated into the smart device, each component being linked by one or more communication units.

The systems described above may receive an additional user input for adjusting the new operation mode of the electrical toothbrush. In the example shown in FIG. 4, the user may provide an additional input to the smart device in order to indicate a desired adjustment to the operation mode of the electrical toothbrush.

The systems may then update the new operation mode based on the additional user input, thereby generating an updated operation mode, and change the operation of the electrical toothbrush to the updated operation mode in a similar manner as described above.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A computer-implemented method for controlling an operation of an electrical toothbrush with an interchangeable brush head, the method comprising:

obtaining an existing operation mode of the electrical toothbrush;

receiving an indication from a brush head identification unit that a new interchangeable brush head has been identified as being provided to the electrical toothbrush;

identifying a new operation mode associated with the new interchangeable brush head, the new operation mode being different from the existing operation mode;

controlling a user interface to request an input from a user to confirm that the operation of the electrical toothbrush should change to the new operation mode; and if the user provides an input confirming that the operation of the electrical toothbrush should change to the new operation mode, changing the operation of the electrical toothbrush to the new operation mode; and if the user provides an input indicating that the operation of the electrical toothbrush should not change to the new operation mode, maintaining the existing operation mode of the electrical toothbrush; and if the user does not provide a user input, maintaining the existing operation mode of the electrical toothbrush.

2. A method as claimed in claim 1, wherein the new operation mode comprises one or more of:

a new brushing routine;

a new brushing intensity;

a new brushing time;

a new brushing amplitude; and a new brushing frequency.

3. A method as claimed in claim 1, the method further comprising:

receiving an additional user input to adjust the new operation mode;

updating the new operation mode based on the additional user input, thereby generating an updated operation mode; and changing the operation of the electrical toothbrush to the updated operation mode.

4. A method as claimed in claim 1, wherein identifying the new interchangeable brush head comprises:

obtaining a brush head identification code from the new interchangeable brush head; and identifying the new interchangeable brush head based on the brush head identification code.

5. A processing unit for controlling an operation of an electrical toothbrush with an interchangeable brush head, wherein the processing unit is adapted to:

obtain an existing operation mode of the electrical toothbrush;

receive an indication from a brush head identification unit that a new interchangeable brush head has been identified as being provided to the electrical toothbrush;

identify a new operation mode associated with the new interchangeable brush head, the new operation mode being different to the existing operation mode;

control a user interface to request an input from a user to confirm that the operation of the electrical toothbrush should change to the new operation mode; and if the user provides an input confirming that the operation of the electrical toothbrush should change to the new operation mode, change the operation of the electrical toothbrush to the new operation mode;

if the user provides an input indicating that the operation of the electrical toothbrush should not change to the new operation mode, maintain the existing operation mode of the electrical toothbrush; and if the user does not provide a user input, maintain the existing operation mode of the electrical toothbrush.

6. A system for controlling an operation of an electrical toothbrush with an interchangeable brush head, the system comprising:

an electrical toothbrush, the electrical toothbrush having a brush head identification unit adapted to obtain an identifier of a new interchangeable brush head;

the processing unit as claimed in claim 5, wherein the processing unit is in communication with the brush head identification unit, and wherein identifying the new interchangeable brush head is based on the identifier of the new interchangeable brush head; and a user interface in communication with the processing unit, wherein the user interface is adapted to:

provide a request to the user to confirm that the operation of the electrical toothbrush should change; and receive a user input in response to the request.

7. A system as claimed in claim 6, wherein the new operation mode comprises one or more of:

a new brushing routine;

a new brushing intensity; and a new brushing time.

8. A system as claimed in claim 6, wherein the processing unit is further adapted to:

receive an additional user input to adjust the new operation mode;

update the new operation mode based on the additional user input, thereby generating an updated operation mode; and change the operation of the electrical toothbrush to the updated operation mode.

9. A system as claimed in claim 6, wherein the processing unit is integrated into the electrical toothbrush.

10. A system as claimed in claim 6, wherein the system further comprises a charging unit adapted to receive the electrical toothbrush, and wherein the processing system is integrated into the charging unit.

11. A system as claimed in claim 6, wherein the processing unit is integrated into a remote processing system, and wherein the electrical toothbrush further comprises a communication unit in communication with the remote processing system.

12. A system as claimed in claim 11, wherein the user interface is integrated into the remote processing system.

13. A system as claimed in claim 12, wherein the remote processing system is incorporated into a smart device.

14. A system as claimed in claim 6, wherein the brush head identification unit comprises one or more of:

a radio frequency identification tag reader, for reading a radio frequency identification tag on the new interchangeable brush head; and a visual code reader, for reading a visual code corresponding to the new interchangeable brush head.

15. A system as claimed in claim 12, wherein the remote processing system is incorporated into a device chosen from the group consisting of a smartphone, a smartwatch, and a smart home device.

* * * * *